United States Patent
Szczerba et al.

(10) Patent No.: US 11,919,392 B2
(45) Date of Patent: Mar. 5, 2024

(54) ROLLABLE/BENDABLE VIRTUAL 3D DISPLAY

(71) Applicant: GM Global Technology Operations LLC, Detroit, MI (US)

(72) Inventors: Joseph F. Szczerba, Grand Blanc, MI (US); Ke Liu, North Billerica, MA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 277 days.

(21) Appl. No.: 17/480,628

(22) Filed: Sep. 21, 2021

(65) Prior Publication Data

US 2023/0089575 A1  Mar. 23, 2023

(51) Int. Cl.
*B60K 35/00* (2006.01)
*H04N 5/645* (2006.01)
*H04N 5/655* (2006.01)

(52) U.S. Cl.
CPC ............. *B60K 35/00* (2013.01); *H04N 5/645* (2013.01); *H04N 5/655* (2013.01); *B60K 35/10* (2024.01); *B60K 35/20* (2024.01); *B60K 35/211* (2024.01); *B60K 35/22* (2024.01); *B60K 35/50* (2024.01); *B60K 35/53* (2024.01); *B60K 35/60* (2024.01); *B60K 2360/1468* (2024.01); *B60K 2360/149* (2024.01); *B60K 2360/151* (2024.01); *B60K 2360/771* (2024.01); *B60K 2360/822* (2024.01)

(58) Field of Classification Search
CPC ............. B60K 34/00; B60K 2370/771; B60K 2370/1531; B60K 2370/149; B60K 2370/67; B60K 2370/822; B60K 2370/1468; B60K 2370/151; H04N 5/645; H04N 5/655

See application file for complete search history.

(56) References Cited

U.S. PATENT DOCUMENTS

| | | | |
|---|---|---|---|
| 2016/0194010 A1* | 7/2016 | Pettibone | B61D 39/002 105/377.09 |
| 2017/0013188 A1 | 1/2017 | Kothari | |
| 2017/0113702 A1 | 4/2017 | Thieberger-Navon et al. | |
| 2018/0367751 A1 | 12/2018 | Devendran et al. | |
| 2019/0100135 A1 | 4/2019 | Rothenberg et al. | |
| 2020/0114763 A1* | 4/2020 | Eom | B60K 35/00 |
| 2020/0130840 A1* | 4/2020 | Frost | E05F 15/643 |
| 2020/0377041 A1* | 12/2020 | Sekizuka | B60R 21/06 |
| 2021/0023948 A1 | 1/2021 | Knittl et al. | |
| 2021/0070177 A1* | 3/2021 | Nitze-Nelson | G06V 20/56 |
| 2021/0208392 A1 | 7/2021 | Jeong et al. | |
| 2021/0219002 A1 | 7/2021 | Barnes et al. | |
| 2022/0191392 A1 | 6/2022 | Kurota | |

FOREIGN PATENT DOCUMENTS

| | | |
|---|---|---|
| DE | 69712501 T2 | 12/2002 |
| DE | 10226406 C1 | 12/2003 |
| DE | 102014006338 A1 | 11/2015 |
| DE | 102019122761 A1 | 2/2020 |
| DE | 102018213058 A1 | 3/2020 |

(Continued)

*Primary Examiner* — Lixi C Simpson
(74) *Attorney, Agent, or Firm* — Vivacqua Crane PLLC

(57) ABSTRACT

A virtual 3D display for a motor vehicle includes a substrate and a flexible display positioned on the substrate. The flexible display is rollable and bendable within a cabin of the motor vehicle.

12 Claims, 6 Drawing Sheets

(56) References Cited

FOREIGN PATENT DOCUMENTS

| | | | | |
|---|---|---|---|---|
| DE | 202020000423 | | 3/2020 | |
| DE | 102020213279 | A1 | 5/2021 | |
| EP | 3822169 | A1 * | 5/2021 | ........... B64C 1/1438 |
| GB | 2243862 | A * | 11/1991 | ............. E06B 3/481 |
| WO | 2009095992 | A1 | 8/2009 | |
| WO | WO-2013018099 | A2 * | 2/2013 | ............. G06F 3/013 |

\* cited by examiner

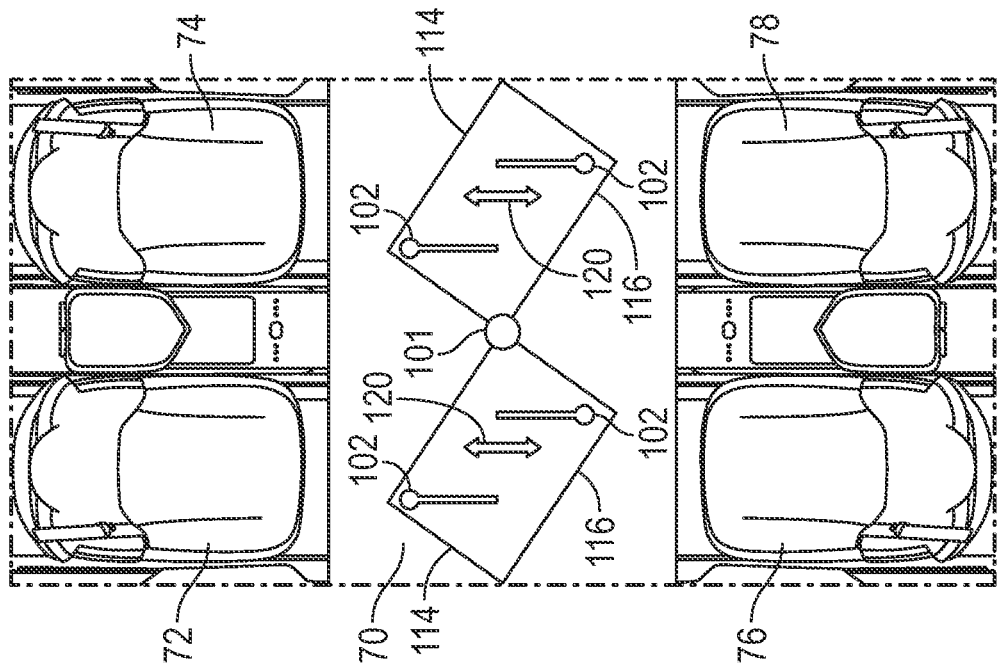
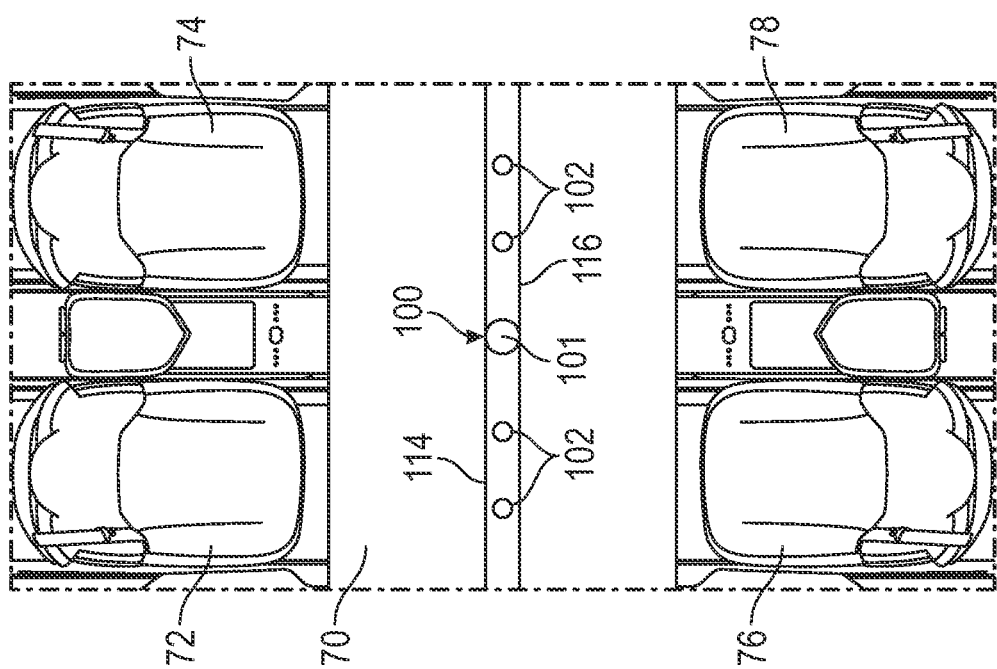

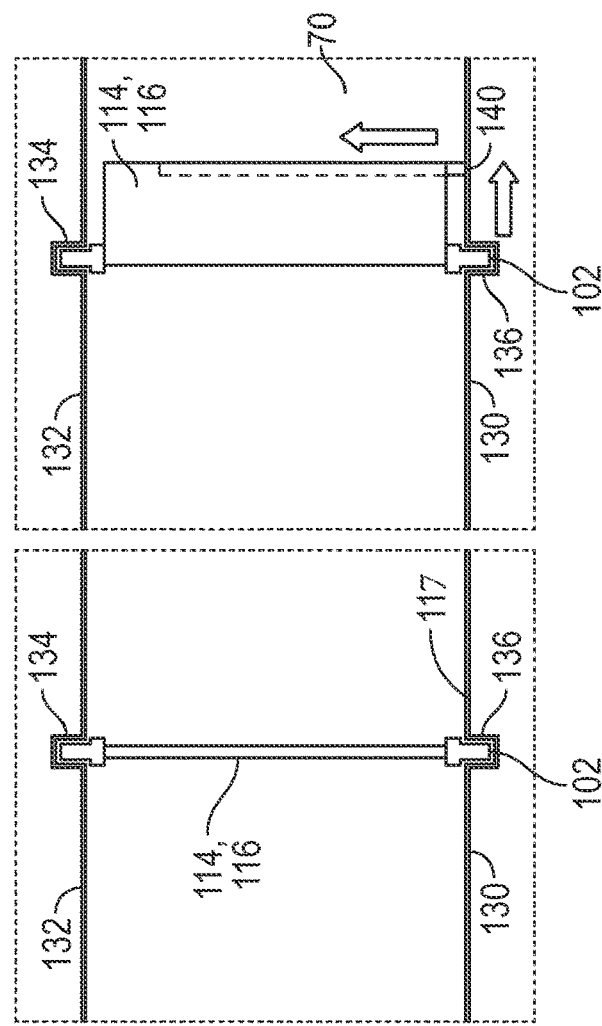
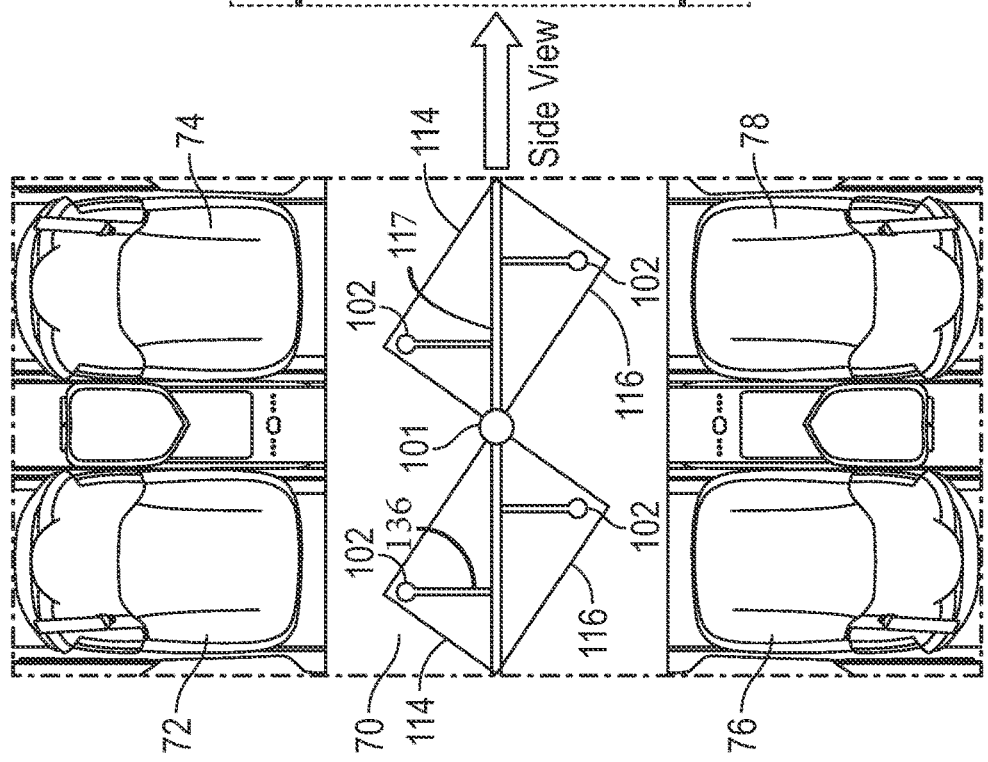

ROLLABLE/BENDABLE VIRTUAL 3D DISPLAY

INTRODUCTION

The present disclosure relates to a visual display in motor vehicles. More specifically, the present disclosure relates to a virtual 3D display for motor vehicles.

Many motor vehicles these days include a visual display that is utilized, for example, for infotainment and navigation purposes. Some of these displays are 2D displays that have limited direct context transfer to real world spatial applications. Some proposals include 3D holographic displays. But these displays are costly to implement in a motor vehicle and provide poor interactions between the display and the surrounding environment, especially the depth of view.

Thus, while current motor vehicle displays achieve their intended purpose, there is a need for a new and improved system and method for creating a 3D display.

SUMMARY

According to several aspects, a virtual 3D display for a motor vehicle includes a substrate and a flexible display positioned on the substrate. The flexible display is rollable and bendable within a cabin of the motor vehicle.

In an additional aspect of the present disclosure, wherein when the display is either unrolled or unrolled and bended, the display provides a divider in the cabin.

In another aspect of the present disclosure, when the display is unrolled and bended, the display provides a street view to occupants in the cabin.

In another aspect of the present disclosure, the display unrolls as the display moves along tracks towards sides of the cabin.

In another aspect of the present disclosure, the display moves along tracks towards a front and a back of the cabin.

In another aspect of the present disclosure the tracks are positioned on a floor and a ceiling of the cabin.

In another aspect of the present disclosure, the display further includes an eye tracker to determine a location and movement of an occupant's eyes.

In another aspect of the present disclosure, the eye tracker communicates with an on-board computer and graphical processing unit to continuously optimize 3D effects based on the location and movement of an occupant's eyes.

In another aspect of the present disclosure, the display creates one or more touch or gesture sensor locations.

In another aspect of the present disclosure, the display reconfigures itself.

In another aspect of the present disclosure, the display reconfigures itself when specific vehicle applications are selected, when a specific driving condition occurs, or a user chooses to do so.

According to several aspects, a virtual 3D display for a motor vehicle includes a substrate, a flexible display positioned on the substrate, the flexible display being rollable and bendable. When the display is either unrolled or unrolled and bended, the display provides a divider in the cabin and a street view to occupants in the cabin.

In another aspect of the present disclosure, the display unrolls as the display moves along tracks towards sides of the cabin, and the display bends as the display moves along tracks towards a front and a back of the cabin.

In another aspect of the present disclosure, the tracks are positioned on a floor and a ceiling of the cabin.

In another aspect of the present disclosure, the display further includes an eye tracker to determine a location and movement of an occupant's eyes.

In another aspect of the present disclosure, the eye tracker communicates with an on-board computer and graphical processing unit to continuously optimize 3D effects for the occupant with regard to the occupant's viewing location.

In another aspect of the present disclosure, the display creates one or more touch or gesture sensor locations.

In another aspect of the present disclosure, the display reconfigures itself when specific vehicle applications are selected, when a specific driving condition occurs, or when a user chooses to do so.

According to several aspects, a virtual 3D display for a motor vehicle includes a substrate, a flexible display positioned on the substrate, the flexible display being rollable and bendable, and a sensor that enables interaction between an occupant of the motor vehicle and the virtual 3D display. The display creates one or more touch or gesture sensor locations that detects gestures by the occupant or detects touches by the occupant.

In another aspect of the present disclosure, the display reconfigures itself when specific vehicle applications are selected, when a specific driving condition occurs, or when a user chooses to do so.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1C illustrates the rollable display shown in FIG. 1A being fully unrolled according to an exemplary embodiment;

FIG. 1D illustrates the rollable display shown in FIG. 1A being unrolled and bent according to an exemplary embodiment;

FIG. 2A illustrates the rollable display shown in FIG. 1A fully unrolled and bent according to an exemplary embodiment according to an exemplary embodiment;

FIGS. 2B and 2C are side views of the rollable display shown in FIG. 2A according to an exemplary embodiment;

DETAILED DESCRIPTION

Figure 1B:
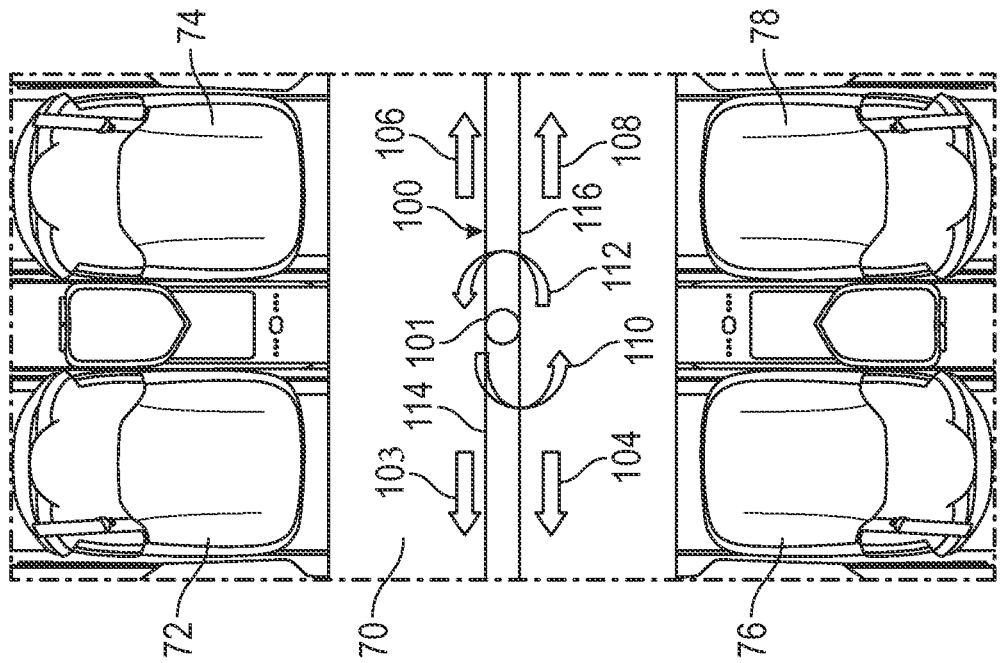
FIG. 1B illustrates the rollable display shown in FIG. 1A being unrolled according to an exemplary embodiment.
Figure 1A:
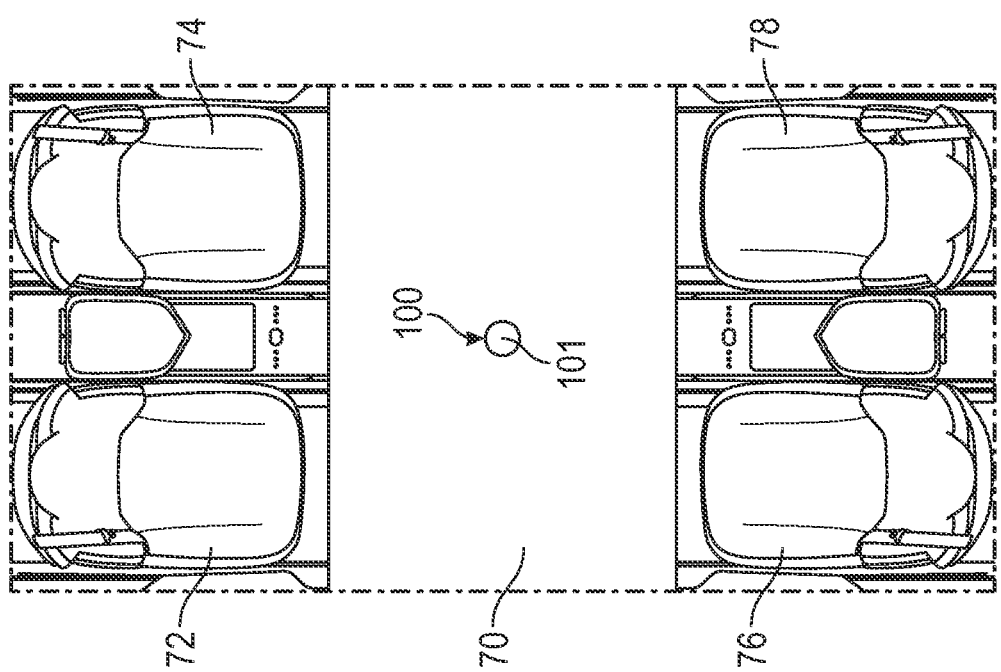
FIG. 1A illustrates a rollable display according to an exemplary embodiment.

The following description is merely exemplary in nature and is not intended to limit the present disclosure, application, or uses.

Referring now to FIGS. 1A through 1D, there is shown a rollable display 100 initially wrapped about a center post 101 situated in a cabin 70. In some implementations, the display is layered with a substrate when it is wrapped around the post 101. The cabin 70 further includes a set of seats 72, 74, 76 and 78 that provides seating for one or more occupants of the cabin 70. The display 100 unrolls from the post 101 as indicated by the arrows 110 and 112 (FIG. 1B), to create two display panels 114 and 116 that extend outwards as indicated by the arrows 103, 104, 106 and 108. The displays 114 and 116 are deployable either manually or automatically. In various implementations, the displays 114 and 116 slide along a first set of tracks 117 in the ceiling and/or floor of the cabin 70 to provide privacy screens for viewing by the occupants of the seats 72, 74, 76 and 78.

As shown in FIG. 1C, a set of secondary posts 102 telescope up from the floor of the cabin 70, and, as shown in FIG. 1D, the posts 102 slide outwards as indicated by the arrows 120 to bend the displays 114 and 116.

Referring further to FIGS. 2A-2C, in sum, if space in a fully-automated vehicle is divided with partitions, the virtual 3D display utilized as a divider in the cabin 70 provides both privacy and street views. For example, the street view is collected using external cameras and then presented to the occupants in the cabin 70. The displays 114 and 116 are full size (floor 132 to ceiling 130) in some implementations or reduced size in other implementations. The dividers are flexible and rollable displays 114 and 116 that deploy when needed and retracted when not desired into the center post 101. A second set of tracks 134 and 136 to deploy the displays 114 and 116 are integrated into the floor and/or ceiling of the cabin 70. As shown in FIG. 2A, the second set of tracks 134 and 136 are perpendicular to the first set of tracks 117. As such, the posts 102 slide in the tracks 134 and 136, while first posts 140 slide outward towards the sides of the cabin 70.

Figure 3:
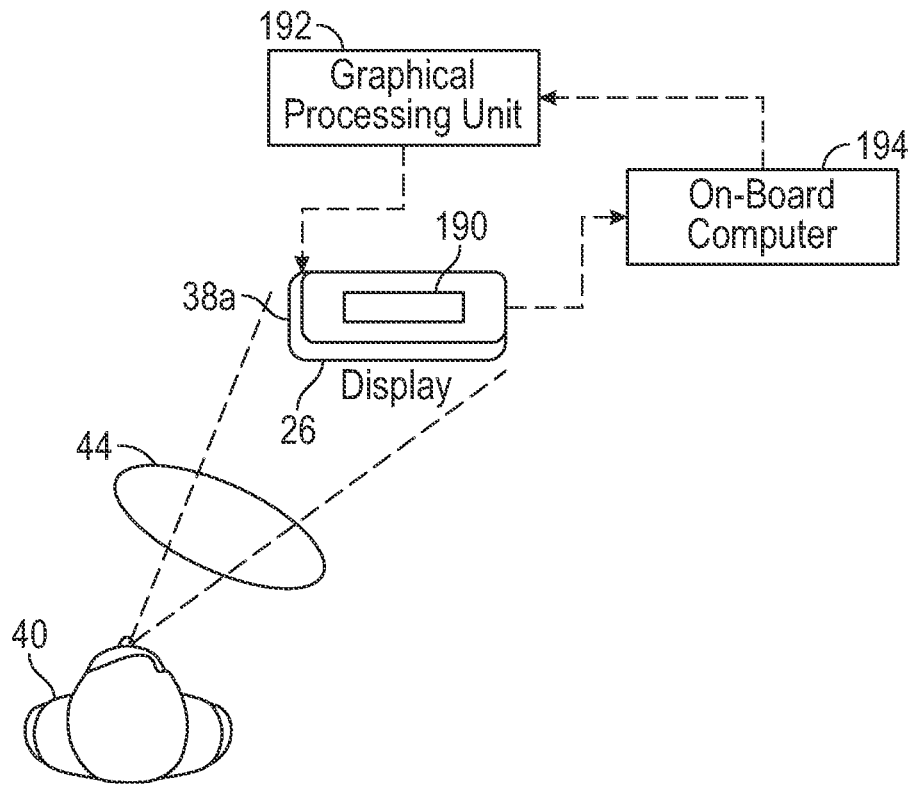
FIG. 3 illustrates a virtual 3D display with an eye tracker according to an exemplary embodiment.

Referring now to FIG. 3, certain implementations of the display 26 includes an eye-tracker 190 so that the virtual volumetric display provides the proper viewpoint to the viewer 40 to optimize the 3D appearance. Specifically, the eye-tracker 90 is utilized to determine the location and movement of the viewers' eyes. Graphical content is adjusted in real time by a graphical processing unit 192 and an on-board computer 194 to maintain the optimum virtual volumetric display effect.

Figure 4:
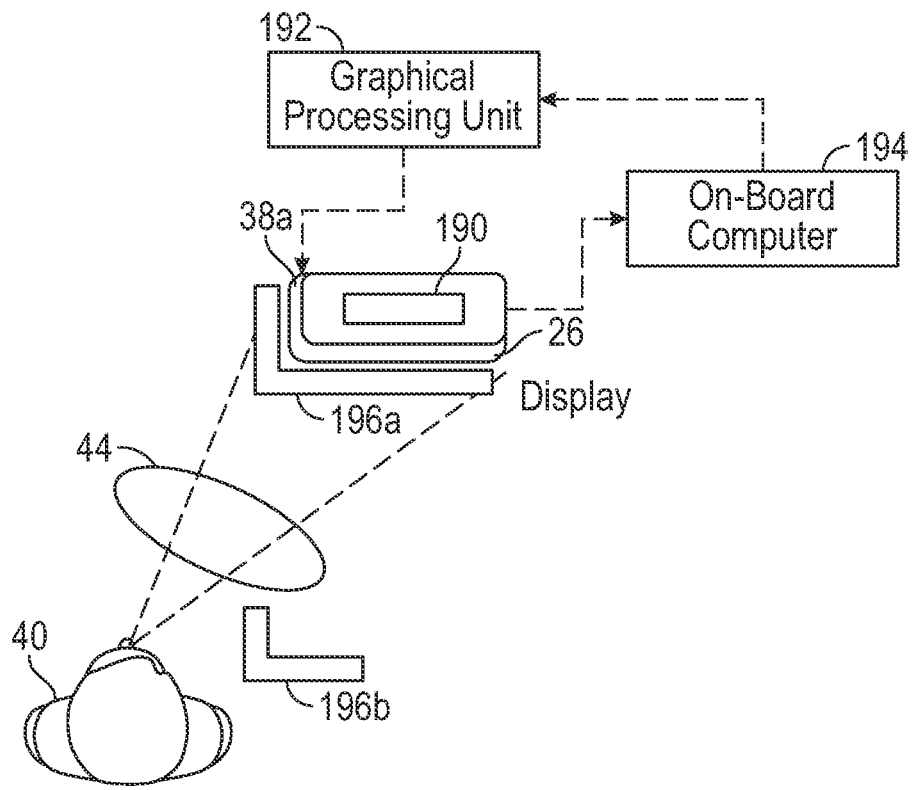
FIG. 4 illustrates the virtual 3D display shown in FIG. 3 with various touch locations according to an exemplary embodiment.

In certain implementations of the aforementioned arrangements, 3D illusions are prioritized to utilize different applications while a user makes various selections on a screen. After learning such behaviors through, for example, artificial intelligence, the application the user is likely to utilize is highlighted by depth illusion. Since the illusion appears more reachable to the user, this implementation increases the user experience of the user. As shown in FIG. 4, the display 26 is capable of creating a virtual touch/gesture sensor at a location 196a around the display 26 or another touch/gesture sensor at a location 196b closer to the occupant 40.

Figure 5:
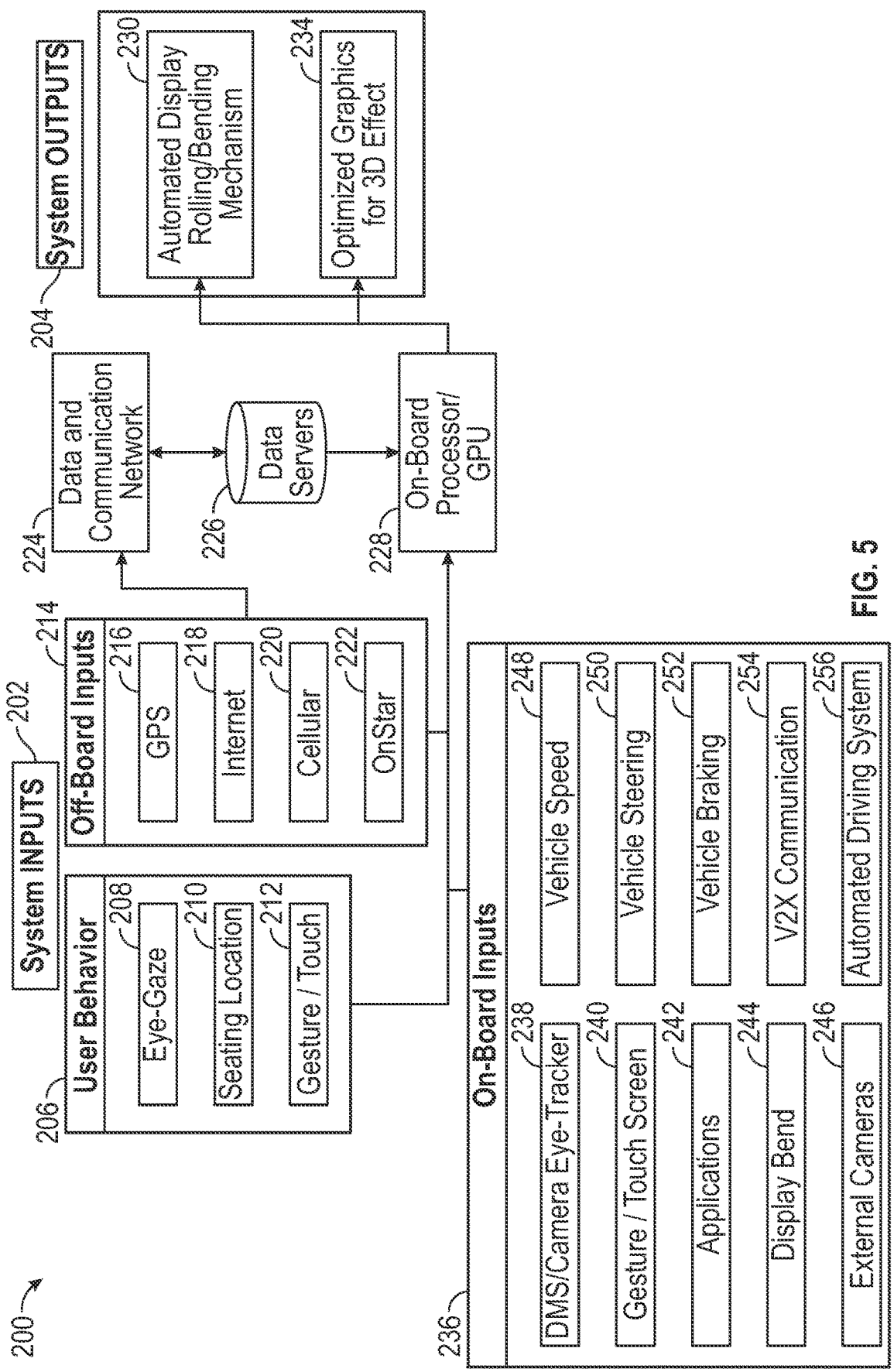
FIG. 5 is a block diagram of components for a virtual 3D display according to an exemplary embodiment.

Turning now to FIG. 5, there is shown a component diagram 200 for a virtual volumetric 3D display. A set of system inputs 202 includes user behavior 206, such as, for example, eye-gaze 208, seating location 210 and gesture/touch 212. Off-board inputs 214 include, for example, GPS 216, the internet 218, cellular input 220 and OnStar 222. On-board inputs include inputs from, for example, DMS/camera eye-tracker 238, gesture/touch screen 240, applications 242, display bend 244, external cameras 246, vehicle speed 248, vehicle steering 250, vehicle braking 252, V2X communication 254, and automated driving system 256.

The off-board inputs 214 are communicated through a data communication network 224 and data servers 226. Information from the data servers 226, the user behavior inputs 206, and the on-board inputs 236 are processed by an on-board processor and graphics processing unit (GPU) 228 System outputs 204 from the on-board processor and GPU 228 include, for example, an automated display bending mechanism 230, multi-view display barrier switching 232 and optimized graphics for 3D effects 234.

Figure 6:
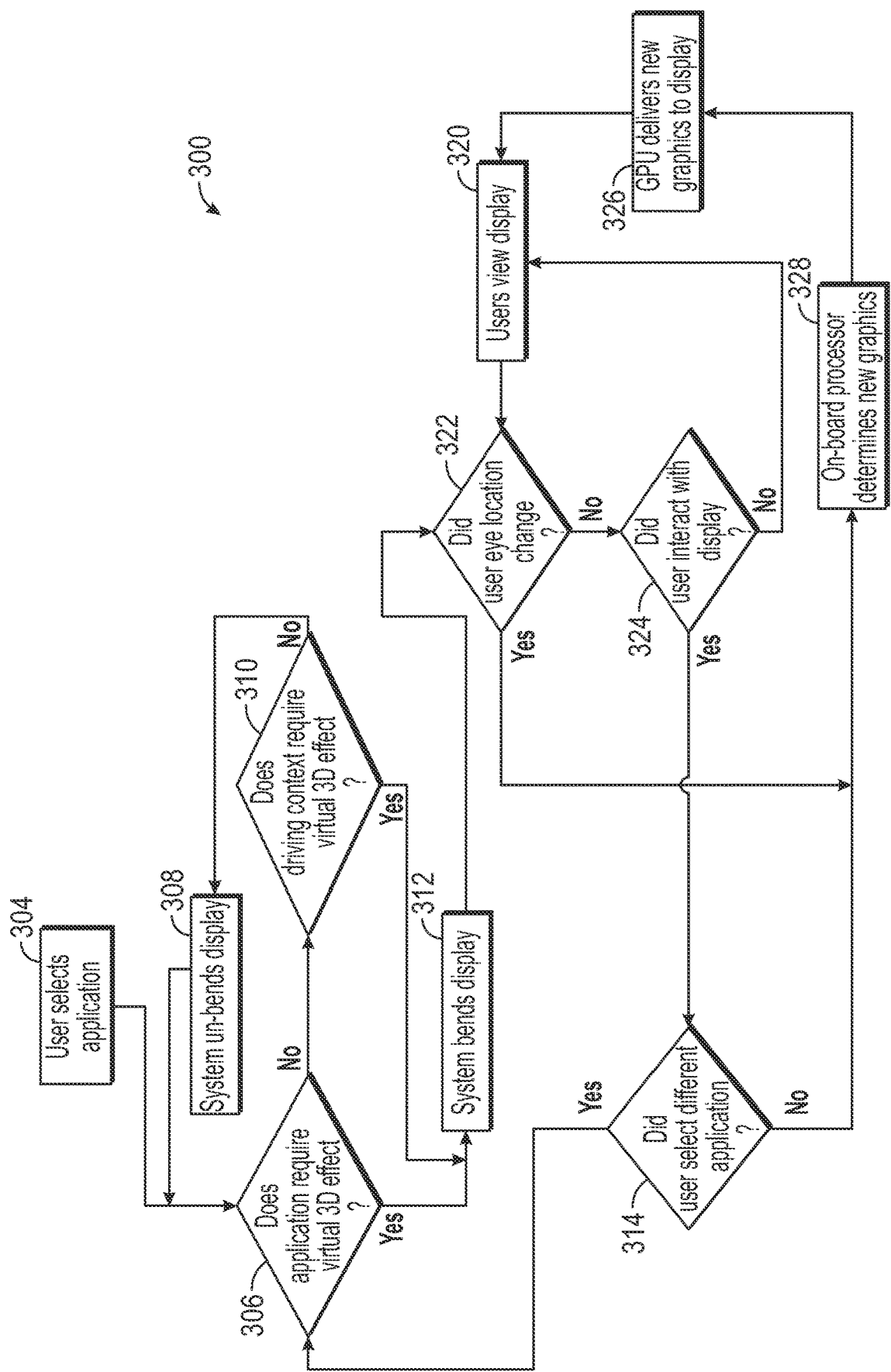
FIG. 6 is a block diagram of a process for utilizing a virtual 3D display according to an exemplary embodiment.

Referring now to FIG. 6, there is shown a process 300 for implementing a virtual volumetric 3D display. Initially, a user enters the vehicle 302 and selects an application 304. The process 300 then determines in a decision step 306 is the selected application requires a virtual 3D effect. If the decision is no, the process determines in a decision step 310 is the driving context requires a virtual 3D effect. If the answer is no, the process unbends the display. If the determination from either steps 306 or 310 is yes, the process 300 bends the display in step 312.

Next in decision step 322, the process 300 determines if the user's eye location changed. If the determination is yes, the on-board processor determines new graphics in step 328 and the GPU delivers new graphics to display in step 326 for the user to view in step 320. In the answer from the decision step 322 is no, then a decision step 324 determines if the user interacted with the display. If that answer is no, the process proceeds to step 320 for user viewing. If the answer is yes, the process proceeds to decision step 314 that determines is the user selected a different application. If the answer is no, the process 300 proceeds to step 328 to determine new graphics. And if the answer is yes, the process proceeds to step 306 to determine of the application requires virtual 3D effects.

A virtual 3D display of the present disclosure offers several advantages, including low costs and providing an association between a 3D environment and the actual world. Such a display is capable of being utilized as an infotainment display, a warning/navigation instruction carrier, a situation awareness (SA) display, or a room divider. The display is capable of use in manual, semi-autonomous and fully autonomous driving to increase SA and user experience.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A virtual 3D display for a cabin in a motor vehicle, the virtual 3D display comprising:
 a center post disposed in the cabin;
 a first set of tracks disposed in a floor and a ceiling of the cabin, the first set of tracks extending across the cabin;
 a second set of tracks disposed in the floor and the ceiling of the cabin, the second set of tracks perpendicular to the first set of tracks;
 a first post disposed in the first set of tracks;
 a plurality of secondary posts configured to telescope up from a floor of the cabin and disposed within the second set of tracks;
 a substrate wrapped around the center post; and
 a flexible display positioned on the substrate, the flexible display being rollable and bendable within the cabin of the motor vehicle;
 wherein the flexible display is unrolled to provide a divider in the cabin when the first post moves in the first set of tracks away from the center post, and wherein the flexible display is bended to provide a virtual 3D effect on the flexible display when the secondary posts telescope up from the floor and move within the second set of tracks.

2. The virtual 3D display of claim 1, wherein when the flexible display is unrolled and bended, the display provides a street view to occupants in the cabin.

3. The virtual 3D display of claim 1, wherein the flexible display unrolls as the flexible display moves along the first set of tracks towards sides of the cabin.

4. The virtual 3D display of claim 3, wherein the flexible display bends as the flexible display moves along the second set of tracks towards a front and a back of the cabin.

5. The virtual 3D display of claim 4, wherein the first and second set of tracks are positioned on a floor and a ceiling of the cabin.

6. The virtual 3D display of claim 5 further comprising an eye tracker to determine a location and movement of an occupant's eyes.

7. The virtual 3D display of claim 6, wherein the eye tracker communicates with an on-board computer and graphical processing unit to continuously optimize 3D effects based on the location and movement of an occupant's eyes.

8. The virtual 3D display of claim 7, wherein the flexible display creates one or more touch or gesture sensor locations.

9. The virtual 3D display of claim 5, wherein the flexible display reconfigures itself when an application is selected by a user, and when the application requires a virtual 3D effect, the flexible display is bended, and when the application does not require a virtual 3D effect, the flexible display is not bended.

10. The virtual 3D display of claim 9, wherein the flexible display reconfigures itself when a specific driving condition occurs, or a user chooses to do so.

11. The virtual 3D display of claim 5, wherein flexible display extends from a roof of the cabin to a floor of the cabin.

12. The virtual 3D display of claim 5, further comprising a second flexible display disposed on the substrate opposite the flexible display, wherein the flexible display faces a front of the cabin and the second flexible display faces a rear of the cabin when the substrate is unrolled.

\* \* \* \* \*